Patented Feb. 25, 1930

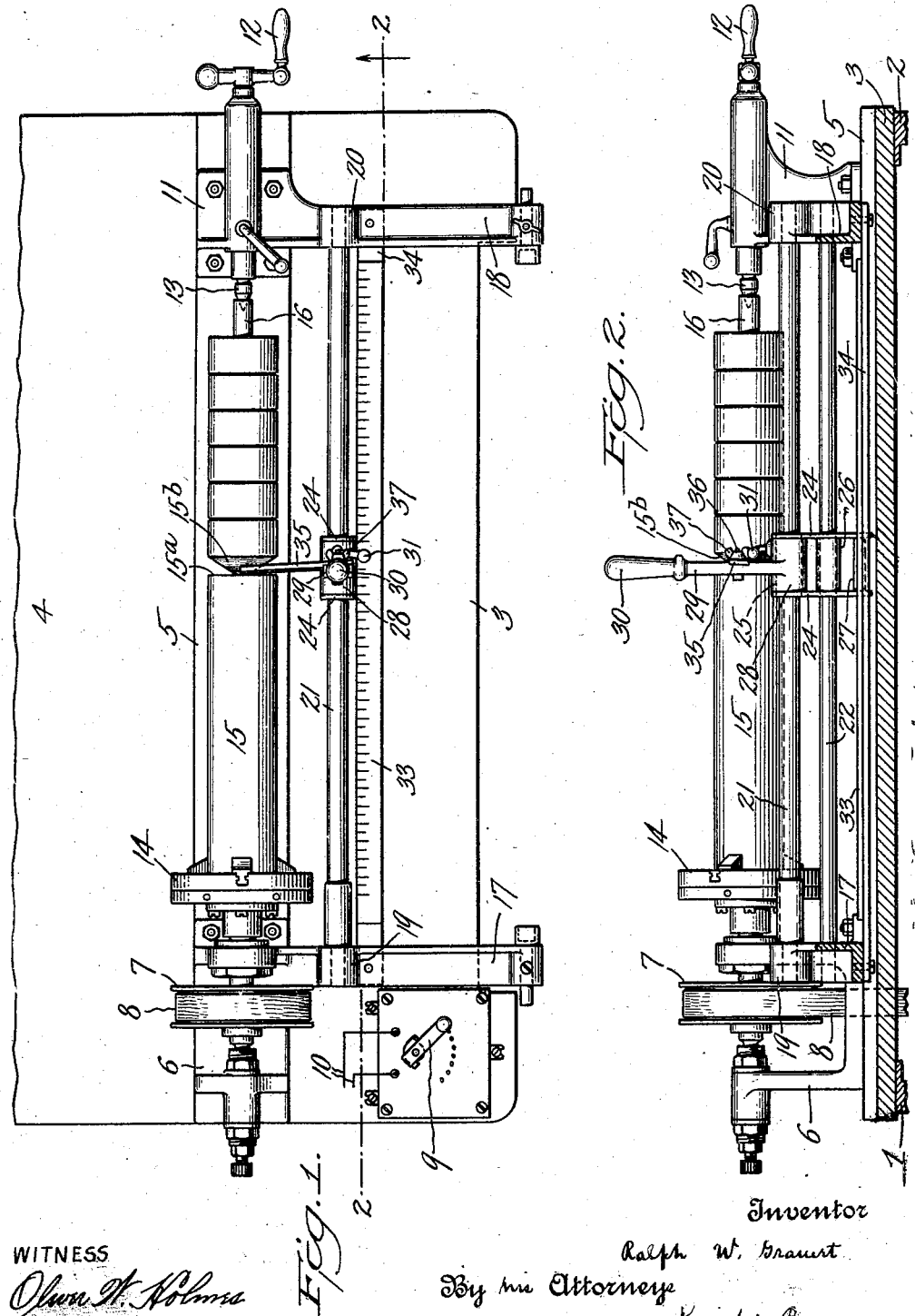

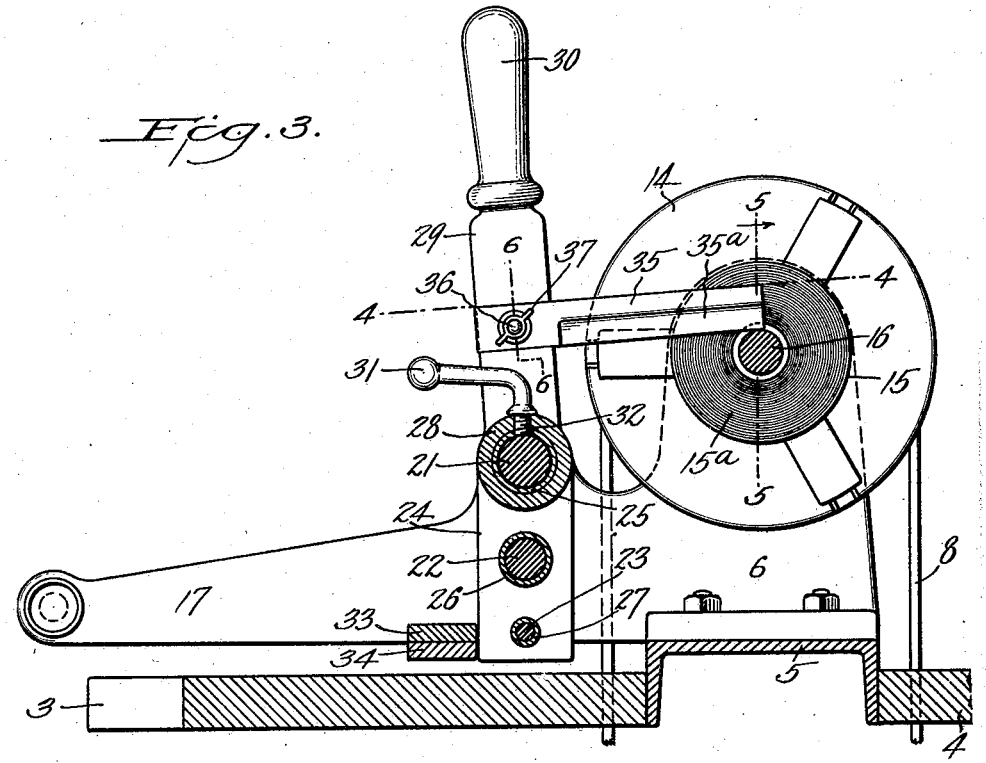
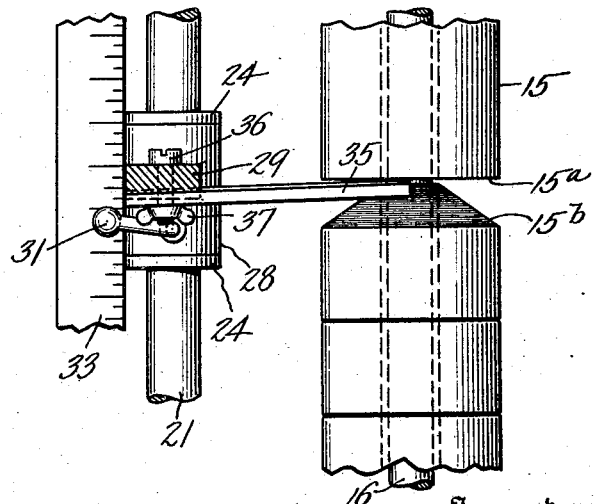
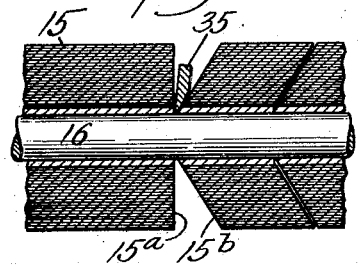
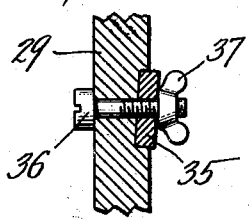

1,748,474

UNITED STATES PATENT OFFICE

RALPH W. GRAUERT, OF WOODRIDGE, NEW JERSEY

MACHINE FOR CUTTING ROLLS

Application filed November 21, 1928. Serial No. 320,923.

This invention relates to rolled web cutting machines and has for its primary object to provide an improved construction, combination and arrangement of parts in a machine of this character whereby the production of rolled web sections may be accomplished easily and rapidly and an improved product secured.

One of the objects of my invention is to provide an improved arrangement and mount of the cutting or parting blade with respect to the rolled web which is to be parted into sections.

Another object of my invention is to provide an adjustable carriage of improved construction for movably supporting the parting blade while at the same time facilitating its adjustment longitudinally with respect to the rolled web.

Certain constructional features of my improved rolled web parting machine will furthermore appear in the specification and be specifically alluded to in the appended claims, reference being had to the accompanying drawings which exemplify my invention in a preferred embodiment.

In the drawings:

Figure 1 is a top plan view of a roll cutting machine embodying my improvements.

Figure 2 is a vertical section on the line 2—2 of Figure 1.

Figure 3 is a vertical transverse section on an enlarged scale of the roll cutting machine.

Figure 4 is an enlarged top plan view and section corresponding to the line 4—4 of Figure 3.

Figure 5 is a fragmentary detail section corresponding to the line 5—5 of Figure 3.

Figure 6 is an enlarged fragmentary section corresponding to the line 6—6 of Figure 3.

According to the embodiment of my invention shown on the drawings, the end frames 1 and 2 support a table comprising a front section 3 and a back section 4 separated by an inverted channel 5. Secured to the flat web portion of the channel 5 is a head stock 6 provided with a pulley 7 driven by a belt 8 which receives its power from a motor (not shown), said motor being under the control of a hand control lever 9 connected thereto by wires 10. A tail stock 11 is secured to the channel section 5, said tail stock being provided with a crank 12 for adjusting a tail center 13 with respect to a screw chuck 14 connected to pulley 7 and driven by belt 8. A rolled web 15 which may be wound upon a hollow tube 15ª, is mounted upon an arbor or spindle 16 and may be clamped at one end between the radially-adjustable jaws of the screw-chuck 14. The head and tail stocks 6 and 11 are provided with extensions 17 and 18 which carry coaxially arranged bearings 19 and 20. Oscillatably mounted in the bearings 19 and 20 is a carriage-supporting shaft 21, a guide rod 22 being arranged below the shaft 21 and mounted at opposite ends in the side frames or extensions 17 and 18. According to the present embodiment of my invention, a suitable cutter carriage may be provided as follows. A short tie-rod 23 has its opposite ends riveted to the outer faces of two axially-spaced side plates 24 and serves together with the sleeves 26 and 27 which are interposed between said side plates to form a rigid structure which is slidable along the guide rod 22. Interposed between the side plates 24 and oscillatable with respect thereto is a sleeve 25 which is adjustable axially along the oscillatory shaft 21. Mounted upon the sleeve 25, is the hub portion 28 of an arm 29 provided with a hand-grip 30. A bent arm 31 provided with a screw end 32 is threaded into the hub portion 28 of lever arm 29 and adapted to impinge upon the oscillatory shaft 21 for locking the cutter blade arm thereto at any point to which it may be adjusted. For properly determining the axial adjustments of the lever arm 29 along the shaft 21, a scale bar 33 is mounted on a transverse bar 34 which is secured at opposite ends to the brackets or extensions 17 and 18. A cutter blade 35 which, as shown in Figure 6, is tilted with respect to the lever arm 29, is secured to said lever arm by means of a screw 36 which carries a clamping wing nut 37. By means of this arrangement of the cutter blade 35 and by having its beveled surface 35ª presented toward the relatively short section which is being parted from the rolled web at each operation, it will be understood from Figure 5 that the flat side of the cutter blade 35 will be inclined away from the cutting plane of said cutter blade while the beveled surface 35ᵃ is imparting a progressive, axial displacement of the parted section. During a clockwise rotation of the rolled web according to Figure 3, the cutter blade will be afforded ample clearance and a smooth, accurate and rapid parting operation may thus be accomplished.

I claim:—

1. In a machine of the character described, the combination with means for rotatably supporting a rolled web, of a shaft oscillatable on an axis parallel to the rotary axis of said rolled web, a guide rod arranged parallel to said oscillatable shaft, a carriage comprising laterally-spaced end plates, rigidly connected by a tubular sleeve reciprocable on said guide rod, another sleeve reciprocable on said shaft and arranged between said laterally-spaced end plates, releasable means for securing the last-mentioned sleeve to said oscillatable shaft, and a cutter blade mounted on the last-mentioned sleeve at an inclination to a plane normal to the axis of said oscillatory shaft, the cutting edge of said cutter blade being movable in said plane.

2. In a machine of the character described, the combination with laterally spaced side frames, of a rotary chuck journaled in one of said side frames for receiving one end of a rolled web, means mounted in the other of said side frames, for supporting the other end of said rolled web, a longitudinal shaft having its opposite ends oscillatable in said side frames, a guide rod arranged parallel to said oscillatable shaft and extending between said side frames, a cutter blade carriage comprising laterally spaced end plates and a tubular sleeve reciprocable on said guide rod and rigidly uniting said end plates, a sleeve oscillatable relatively to and arranged between said laterally-spaced end plates, said sleeve being adjustable on said oscillatable shaft, releasable means for securing said sleeve to said oscillatable shaft in any of its adjusted positions, and a cutter blade mounted on said sleeve and inclined to the axis of said oscillatory shaft.

3. In a machine of the character described, the combination with a rotary chuck for a rolled web, of an oscillatable shaft parallel to the rotary axis of said chuck, a guide rod parallel to said oscillatable shaft, a carriage reciprocable on said guide rod, said carriage comprising laterally-spaced end plates and a tubular sleeve reciprocable on said guide rod and rigidly uniting said end plates, a sleeve oscillatable relatively to and arranged between said laterally-spaced end plates, said sleeve being reciprocably adjustable on said oscillatable shaft, releasable means for securing said sleeve to said oscillatable shaft in any of its adjusted positions, a bracket-arm mounted on said adjustable sleeve and provided with a handle, and a cutter blade mounted on said bracket arm in a plane inclined to the axis of said oscillatory shaft.

4. In a machine of the character described, the combination with laterally-spaced side-frames, of a head stock carried by one of said side-frames, a tail stock mounted on the other of said side-frames, a power-driven chuck journaled in said head-stock, said chuck being adapted to rotate a web-roll supported between said head and tail stocks, a longitudinal shaft having its opposite ends oscillatable in said side-frames, a guide rod arranged parallel to said oscillatable shaft and extending between said side-frames, a carriage reciprocable on said guide rod, said carriage comprising laterally-spaced end plates, and means rigidly uniting said end plates, said means including a tubular sleeve reciprocable on said guide rod, a sleeve oscillatable relatively to and arranged between said laterally-spaced end-plates, the last-mentioned sleeve being movable on said oscillatable shaft, releasable means for securing said sleeve to said oscillatable shaft in any of its adjusted positions, a bracket-arm mounted on said adjustable sleeve and provided with a handle, and a cutter blade mounted on said bracket-arm in a plane inclined to the axis of said oscillatory shaft.

RALPH W. GRAUERT.